Figure 1:
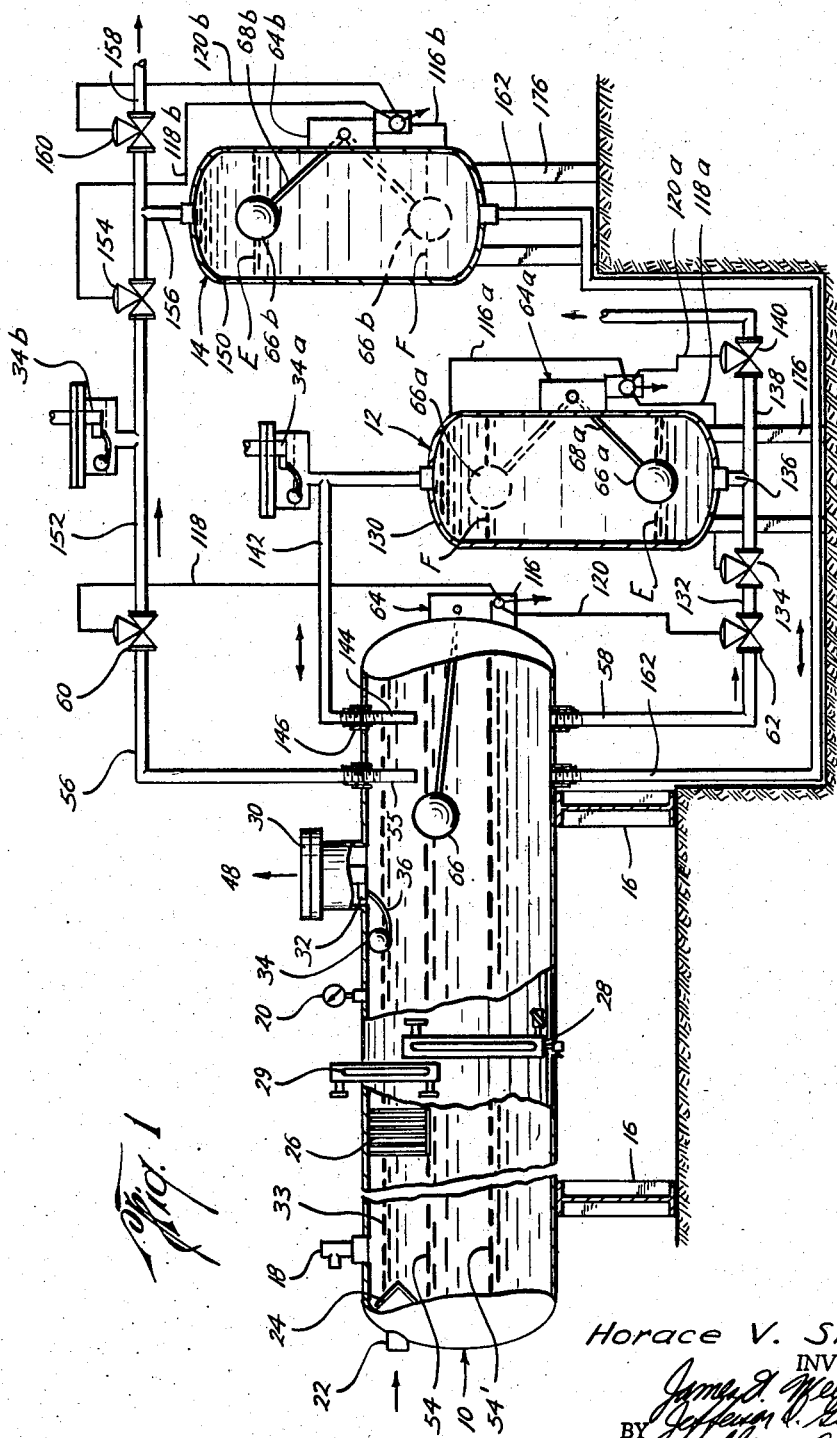

April 21, 1959 H. V. SMITH 2,882,995
SEPARATOR - METERING ASSEMBLY
Filed Dec. 26, 1957 3 Sheets-Sheet 1

Horace V. Smith
INVENTOR.

BY

ATTORNEYS

April 21, 1959 H. V. SMITH 2,882,995
SEPARATOR — METERING ASSEMBLY
Filed Dec. 26, 1957
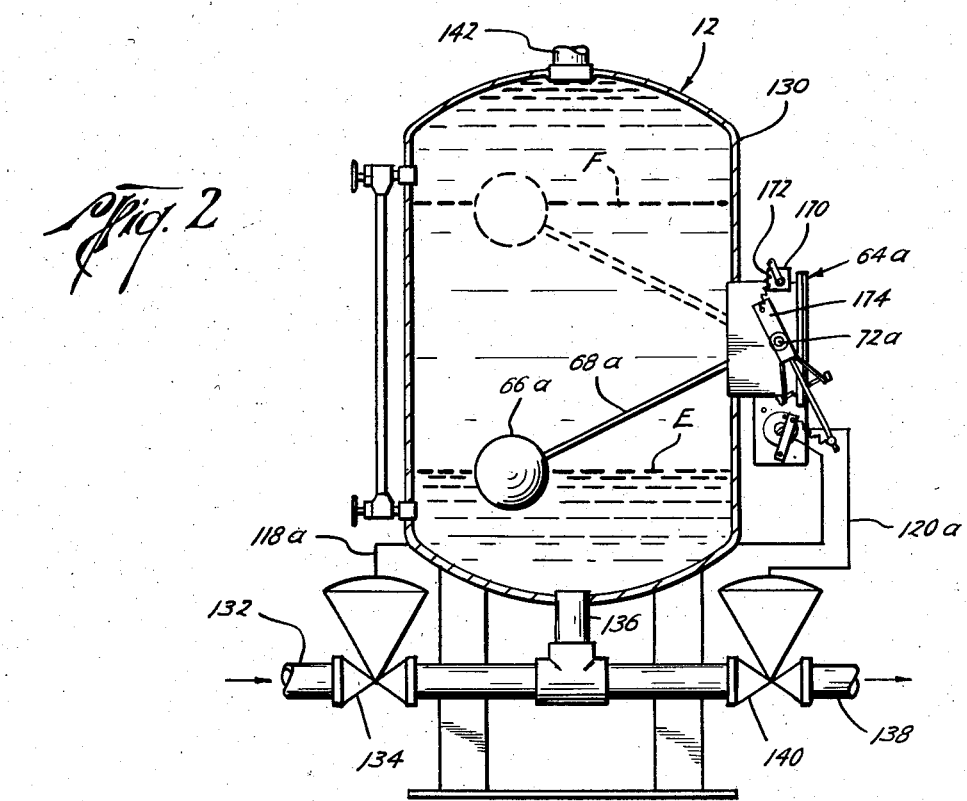
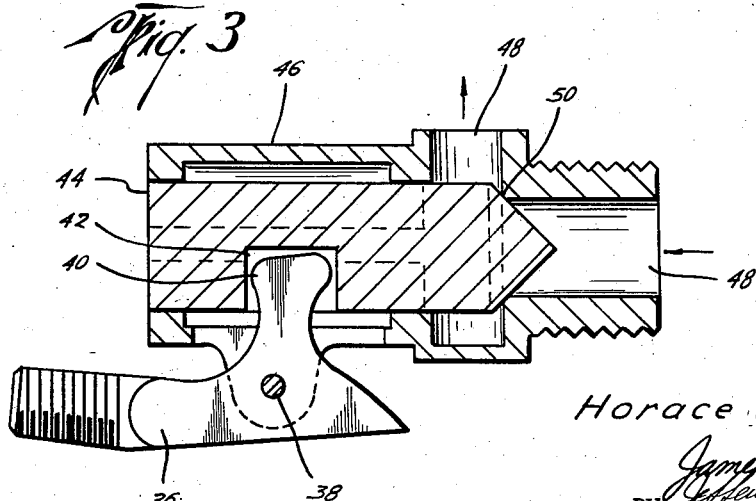
Horace V. Smith
INVENTOR.
ATTORNEYS

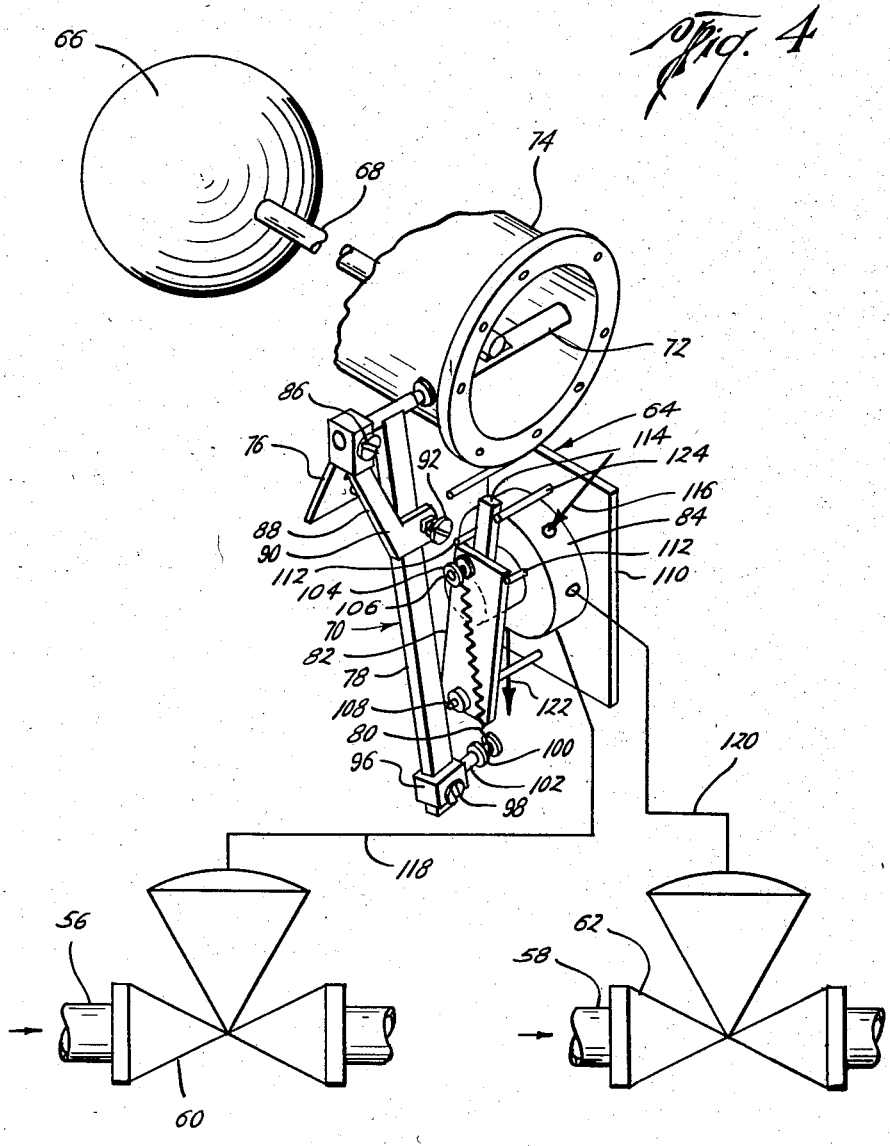

United States Patent Office 2,882,995
Patented Apr. 21, 1959

2,882,995

SEPARATOR-METERING ASSEMBLY

Horace V. Smith, Houston, Tex., assignor to Oil Metering and Processing Equipment Corp., Houston, Tex., a corporation of Texas Application December 26, 1957, Serial No. 705,179

6 Claims. (Cl. 183—2.7)

This invention relates to an assembly for separating liquids and gas and metering liquids and more particularly to such an assembly for use in separately metering from a separator two immiscible liquids of different densities.

Oil wells normally produce a mixture of water, liquid hydrocarbons and gas. Commonly the flow lines from such producing oil wells pass this mixture through a separator separating the gas from the liquids with the liquids being removed from the separator and metered.

It is a general purpose of the present invention to provide an improved separator-metering assembly which separates gas and two immiscible liquids of different densities, or separates the two immiscible liquids in the event gas is not present, separately meters the two liquids, and is particularly adapted for use with fluids from oil wells. However, it is to be understood that the invention may be used with any two immiscible liquids of different densities.

It is a more particular object of the present invention to provide a separator-metering assembly in which mixtures of hydrocarbons and water from a continuously flowing stream are allowed to separate into two layers by gravity in a separating vessel and are separately passed through the action of pressure in the separator and gravity into and through separate metering apparatus where the two liquids are separately metered.

In near depleted primary production of oil wells and in secondary recovery production by water flood operations there is normally little if any natural gas produced with the oil and conventional separating and metering units now available require gas or vapor to actuate the control valves in the separator vessels and metering vessels. Such units are therefore not satisfactory for use where little natural gas if any is produced and it is therefore a further object of the present invention to provide a separator-metering assembly in which a liquid-liquid interface level formed in the separator vessel by the two liquids actuates valve control means to alternately withdraw the light liquid or heavy liquid from the separator vessel for separate metering.

Another object of the present invention is to provide such an assembly having valve control means for the separator vessel and each of the metering apparatus actuated by liquid pressure from liquid in the system.

Still another object of the present invention is to provide such an assembly which is economical to maintain and dependable in use.

Other and further objects, features, and advantages will be apparent from the following description of the preferred example of the invention, given for the purpose of disclosure and taken in conjunction with the accompanying drawings, where like character references designate like parts throughout the several views, and where Figure 1 is a partially diagrammatic elevation of the separator-metering assembly of the present invention, Figure 2 is an enlarged partially diagrammatic partially sectional elevation of a metering apparatus of the present invention, Figure 3 is a fragmentary enlarged sectional elevation of a portion of a gas eliminator valve assembly of the present invention, and Figure 4 is a perspective view of a preferred form of valve control means for use with the separator vessel and each of the liquid metering apparatus.

Referring now to the drawings, and particularly to Figure 1, the separator-metering assembly as a whole includes the cylindrical elongate separator vessel indicated generally by the numeral 10, a heavy liquid metering apparatus indicated generally by the numeral 12, and a light liquid metering apparatus indicated generally by the numeral 14.

The separator vessel 10 may be supported by steel saddles 16 and provided with a safety valve connection 18 and a pressure gauge 20. Provided at the left end of the separator vessel 10 is a fluid inlet 22 adjacent which is located an impingement plate 24 to break up the velocity of fluids entering the fluid inlet 22 and to the right of or downstream of the fluid inlet 22 is a conventional gas scrubbing element 26 set transversely of the separator vessel 10 to remove the liquid mist from any gas which might enter the fluid inlet 22. Conventional sight gauges 28 and 29 may also be provided for observance of the liquid levels in the separator vessel 10. These elements associated with the separator vessel 10 are conventional and do not themselves constitute the invention. A certain amount of gas is used in the separator vessel 10 to move light liquid from the separator vessel 10 into the light liquid metering apparatus 14 but gas is not desirable in the metering apparatus 12 and 14. The necessary gas cushion to assist such liquid in leaving the separator vessel 10 is provided by gas in the upper portion of the separator vessel 10 and also preferably in a gas dome 30. To remove excess gas which may be contained in well fluids entering the fluid inlet 22 means are provided to separate such excess gas from the system before it reaches the metering apparatus 12 and 14 such as by a gas eliminator valve 32 in the gas dome 30 with the gas eliminator valve 32 being controlled by the gas-liquid interface 33. Any conventional gas eliminator valve which opens at a predetermined low gas-liquid interface and closes at a predetermined high gas-liquid interface may be used such as the one illustrated in Figures 1 and 3 which includes a float 34 rigidly connected to a float arm 36 pivotally mounted at 38 for vertical movement responsive to changes in the level of the gas-liquid interface 33. Made a part of the float arm 36 and movable therewith is a valve lever 40 loosely received in a notch 42 in the lower portion of a valve piston 44 slideable in the valve body 46 so that vertical movement of the float 34 reciprocates the valve piston 44 from left to right as viewed in Figure 3, alternately opening in a lower position of the float 34 and closing in an upper position of the float 34 the gas outlet passage 48 communicating between the gas dome 30 and the exterior of the separator vessel 10 by sealing or opening the gas outlet passageway 48 at the valve seat 50.

Oil well fluids entering the supply inlet 22 will form in the separator vessel 10 a gas-hydrocarbon or gas-liquid interface 33 and a liquid hydrocarbon-water or liquid-liquid interface 54 below which liquid-liquid interface will be a layer of water and above which will be a layer of liquid hydrocarbon. As will be explained later, the light liquid passes into a nipple 55 of a light liquid exhaust line 56 to the light liquid metering apparatus 14 and the heavy liquid passes through a heavy liquid exhaust line 58 to the heavy liquid metering apparatus 12 for separate metering of the light and heavy liquids. The light and heavy liquid exhaust lines 56 and 58 respectively are alternately and simultaneously opened and closed to the passage of liquid in response to changing levels of the liquid-liquid interface 54 in the separator vessel 10 by means of the flow valve 60 in the light liquid exhaust line 56 and the flow valve 62 in the heavy liquid exhaust line 58 controlled by separator valve control means such as the separator valve control assembly indicated generally at 64.

Referring now to Figure 4 there can be seen the preferred form of separator valve control assembly 64 for controlling the flow valves 60 and 62 with such flow valves here being illustrated as normally closed single acting pressure responsive motor valves which are opened by the application or removal of pressure. Such pressure responsive motor valves are readily available on the market and no further description of them is necessary.

The separator valve control assembly 64 includes a weighted float 66 adapted to float in the heavy liquid but not in the light liquid in the separator vessel 10 so that such weighted float 66 floats on the liquid-liquid interface 54. Rigidly secured to this float 66 is a float arm 68 which when moved vertically by movement of the float 66 in response to changing level of the liquid-liquid interface 54 operates a snap acting pilot assembly indicated generally by the numeral 70 alternately directing liquid pressure to and draining it from the flow valves 60 and 62 thereby alternately and simultaneously actuating such valves 60 and 62.

As best seen in Figure 4 the snap acting pilot assembly 70 includes as a whole the control member or rock shaft 72 mounted for oscillating rotatable movement such as through a tubular nozzle 74 opening into the separator vessel 10; an adjustable engaging member 76 secured on an end of the rock shaft 72 extending from the nozzle 74; a swing arm 78 pivotally mounted on the rock shaft 72 for independent rotation therewith; and tension spring linkage 80 secured to the swing arm 78 and to a pivot arm 82 actuating a four-way pilot valve 84. The rock shaft 72 is pivotally mounted in any conventional way and is oscillatably rotated by movement of the float 66 on the float arm 68 which is rigidly secured to the rock shaft 72. Thus, as the float 66 rises and falls with changes of level of the liquid-liquid interface 54 the float arm 68 causes an oscillating rotation of the rock shaft 72.

The engaging member 76 is adjustably secured, such as by a set screw 86, to the end of the rock shaft 72 extending from the nozzle 74 for rotation therewith and includes a generally U-shaped bracket formed of a pair of generally L-shaped brackets 88. Disposed in the free end 90 of each L-shaped bracket 88 is a contact screw 92 by which suitable adjustment may be made for calibrating the snap acting pilot mechanism as will be presently described.

Rotatably secured at its upper end, such as by the journal bearing 94 is the downwardly extending swing arm 78 on the lower end of which is a slideable sleeve 96 which may be secured in any position along the arm 78 by means of the adjusting screw 98. A grooved rotatable sleeve 100 to help reduce friction is secured on a pin 102 secured to and extending from the slideable sleeve 96. One end of tension spring 80 is secured in a groove on this rotatable sleeve 100 and the upper end is secured in a similar grooved rotatable sleeve 104 attached to a pin 106 extending from the pivot arm 82. The pivot arm 82 is pivotally mounted such as by the shaft 108 in a plate 110 holding the pilot valve 84. Secured to and projecting from the upper end of the pivot arm 82 is a pair of spaced projections 112 forming contact members that straddle the pilot actuating arm 114 of the pilot valve 84 and strike the pilot actuating arm 114 when the pivot arm 82 is moved from side to side thereby moving the pilot actuating arm 114 and actuating the pilot valve 84.

The pilot valve 84 here illustrated is connected to a pressure supply line 116 from the water level of the separator chamber 10 which supplies liquid pressure to the pilot valve 84 with pressure being selectively directed from said pilot valve 84 through the first and second pressure lines 118 and 120 to the flow valves 60 and 62 respectively by movement of the pilot actuating arm 114. A conventional exhaust port 122 permits back pressure to drain from the pressure line 118 or 120 not then being supplied with fluid pressure.

It is to be noted that the tension spring 80 is connected to the swing arm 78 on one side of the shaft 108 forming the pivot point of the pivot arm 82 and connected to the pivot arm 82 on the other side of the shaft or pivot point 108. Thus, the tension of the spring 80 tends to hold the pivot arm 82 on whatever side of the shaft 108 the lower end of the spring 80 is at that time.

To prevent the pivot arm 82 from damaging the pilot valve 84 when the pilot actuating arm 114 is thrown from side to side by the projections 112, a pair of stops 124 extend outwardly from the plate 110 on each side of the pilot actuating arm 114. These stops 124 are spaced so that the pilot actuating arm 114 has sufficient movement to operate the pilot valve, but are placed close enough together to prevent damage to the pilot valve 84.

In operation of this particular snap acting pilot assembly 70, the rock shaft 72 is oscillatably rotated by vertical swinging of the float 66 and a corresponding movement is transmitted to the L-shaped brackets 88. This causes alternate inner ends of the contact screws 92, after predetermined movement, to contact the swing arm 78 and swing it first in one direction and then in the other in response to movement of the float 66 as described. As the swing arm 78 moves from one side to the other tension on the spring 80, when it passes the straight line through the shaft 108 and the pin 106, snaps the pivot arm 82 from one extreme position to the other. As the pivot arm 82 is oscillated on its shaft 108 the projections 112 strike the pilot actuating arm 114 actuating the pilot valve 84.

Varying the distance between the inner ends of the contact screws 92 and the swing arm 78 calibrates the snap acting pilot assembly 70 by varying the angular rotation of the rock shaft 72 necessary to cause contact between the engaging member 76 and the swing arm 78. Also, adjustment of the slideable sleeve 96 along the swing arm 78 adjusts the tension on the spring 80.

This snap acting mechanism other than the pilot valve is disclosed and claimed in Patent No. 2,818,738 issued January 7, 1958 for a Snap Acting Mechanism upon my application.

The pilot valve 84 may be of any preferred type of four-way valve with an exhaust of which several are readily available on the market. Accordingly, no detailed description of such pilot valve is necessary.

In operation of the separator valve control means 64 and flow valves 60 and 62, when the liquid-liquid interface 54 is at its uppermost level as illustrated in Figure 1 the float 66 will operate the snap acting pilot assembly 70 to supply liquid under pressure to the flow valve 62 opening it and will drain liquid from the flow valve 60 through the pressure line 118 exhausting it out the pilot valve 84 permitting the flow valve 60 to close. Such action opens the heavy liquid exhaust line 58 to the heavy liquid metering apparatus 12 and closes the light liquid exhaust line 56 to the light liquid metering apparatus 14. As the liquid-liquid interface 54 falls due to drainage of the heavy liquid out the heavy liquid exhaust line 58, as will be explained later, the float 66 will follow this liquid-liquid interface downwardly until the liquid-liquid interface reaches the position illustrated by the line 54' at which point the snap acting pilot assembly 70 will be actuated to supply liquid under pressure to the flow valve 60 in the light liquid exhaust line 56 opening this flow valve 60 and will simultaneously allow liquid under pressure from flow valve 62 in the heavy liquid flow line 58 to drain out the pressure line 120 through the pilot valve 84 permitting flow valve 62 to close. When this occurs no liquid can flow through the heavy liquid exhaust line 58 to the heavy liquid metering apparatus 12 but light liquid may flow through the light liquid exhaust line 56 to the light liquid metering apparatus 14. As more well fluids containing water enter the fluid inlet 22 the liquid-liquid interface will again rise until it reaches the uppermost level shown at 54 whereupon the position of the float 66 will cause the flow valve 60 in the light liquid flow line 56 to close and the flow valve 62 in the heavy liquid exhaust line 58 to open, repeating the cycle.

Referring to Figures 1 and 2, the heavy liquid metering apparatus 12 includes a metering vessel 130 to receive measured quantities of liquid flowing therethrough. A liquid inlet line 132 controlled by the inlet valve 134 is connected to the heavy liquid exhaust line 58 downstream of the flow valve 62 and to the common line 136 extending into the metering vessel 130 at its lower portion. Similarly, a liquid outlet line 138 controlled by the outlet valve 140 is connected to the common line 136. Thus, upon alternate actuation of the inlet and outlet valves 134 and 140 heavy liquid, such as water, is permitted to fill and drain from the metering vessel 130.

Vertically spaced above the point of communication of the outlet line 138 to the metering vessel 130, such as at the top of the metering vessel 130, is a point of connection of a light liquid flow line 142 communicating with the light liquid layer in the separator vessel 10. As illustrated in Figure 1 this light liquid flow line 142 is preferably provided with a nipple 144 held in place such as by the threaded coupling 146 which nipple 144 extends into the light liquid layer below the gas layer so that only light liquid may enter this light liquid flow line 142. As thus constructed, light liquid is free to enter through the light liquid flow line 142 into the upper portion of the metering vessel 130 and heavy liquid enters and leaves the lower portion of the metering vessel 130 through the common line 136. In operation, as will be explained later, the metering vessel 130 will always contain a liquid interface dividing a light liquid and a heavy liquid layer.

Associated with the metering vessel 130 and the inlet and outlet valves 134 and 140 respectively is a valve control mechanism 64a in all respects identical to the valve control mechanism 64 associated with the separator chamber 10. This valve control assembly 64a includes the weighted float 66a designed to float in the heavy liquid so that the float 66a follows the liquid interface in the metering vessel 130 as the liquid interface moves between the E and F positions illustrated in Figures 1 and 2. When the weighted float 66a is in the position illustrated in Figures 1 and 2 at the E level the valve control assembly 64a applies liquid pressure from the pressure line 116a to the inlet valve 134 opening it and drains pressure from the outlet valve 140 through the pressure line 120a allowing the outlet valve 140 to close. When the liquid interface has risen to position F and the float 66a is in its upper position the valve control mechanism 64a will drain pressure from the inlet valve 134 through the pressure line 118a and apply pressure from pressure line 116a to the outlet valve 140 closing it permitting the heavy liquid to drain out the outlet line 138 until the liquid interface reaches the position E whereupon the cycle is reversed.

As a count is desired of each time the heavy liquid metering vessel 130 empties and fills of the liquid being metered a counting means is provided such as illustrated in Figure 2 associated with the valve control assembly 64a. This includes a counter 170 actuated by a spring 172 connected to an arm 174 secured to the rock shaft 72a so that each time the rock shaft 72a is oscillated by the float 66a the counter 170 is actuated.

Referring now to the light liquid metering apparatus 14 (Figure 1), a metering vessel 150 is provided to receive measured quantities of light liquid flowing therethrough. A liquid inlet line 152 controlled by the inlet valve 154 is connected to the light liquid exhaust line 56 downstream of the flow valve 60 and to the common line 156 extending into the metering vessel 150 at its upper portion. Similarly, a liquid outlet line 158 controlled by the outlet valve 160 is connected to the common line 156. Thus, upon alternate simultaneous actuation of the valves 154 and 160 light liquid is permitted to fill and drain from the metering vessel 150.

Vertically spaced below the point of communication of the outlet line 158 with the metering vessel 150, such as at the lower end thereof, is the point of communication of a heavy liquid flow line 162 which communicates with the heavy liquid layer in the separator vessel 10 such as at the bottom thereof so that heavy liquid is free to flow through this heavy liquid flow line 162 between the separator vessel 10 and the metering vessel 150.

Associated with the inlet and outlet valves 154 and 160 and with the metering vessel 150 is a valve control assembly 64b in all respects identical to the valve control assembly 64a of the heavy liquid metering apparatus 12 and the separator valve control assembly 64. This metering vessel 150 is always filled with a light liquid and heavy liquid forming a liquid-liquid interface and the weighted float 66b is designed to float in the heavy liquid at the liquid interface. When the liquid interface is at its lower position F, so that the float 66b is at its lower position, the valve control assembly 64b permits water under pressure to be supplied through line 116b to the outlet valve 160 opening it and simultaneously drains pressure from the inlet valve 154 through the pressure line 118b closing the inlet valve 154. When the liquid interface rises to the E position at which position the float 66b will reach the position illustrated in Figure 1 the valve control assembly 64b will apply liquid pressure from line 116b to the inlet valve 154 opening it and will simultaneously drain pressure from the outlet valve 160 through the pressure line 120b closing the outlet valve 160.

Provided, but not separately shown, for counting the number of times the liquid metering vessel 150 empties and fills is a counting means identical to that shown in Figure 2.

It is to be noted that the metering vessel 130 of the heavy liquid metering apparatus 12 is so located that the E position or lowest level of the liquid interface is below the level of the lowest position 54' of the liquid-liquid interface in the separator vessel 10. Metering vessel 150 of the light liquid metering apparatus 14 is vertically positioned so that the E or highest position of the liquid interface is above the highest position of the liquid-liquid interface 54 in the separator vessel 10. Suitable supports such as the stands 176 are provided to hold the metering vessels 130 and 150 at the proper elevations.

Due to pressure and temperature changes and other causes gas in the liquids leaving the separator vessel 10 may be released. Such gas is not desirable, especially in the stream flowing to the light liquid metering vessel 150, and a gas eliminator valve 34b identical to the gas eliminator valve 34 may be provided in the light liquid exhaust line 56 and a similar gas eliminator valve 34a may be provided in the heavy liquid flow line 142.

In operation the system illustrated in Figure 1 is initially charged with a light liquid and heavy liquid, here referred to as liquid hydrocarbon and water, by filling the lower portions of the liquid metering assemblies 12 and 14 with water and the upper portions with liquid hydrocarbons and by filling the separator vessel 10 with water in the lower portion and liquid hydrocarbons in the upper portion except for a gas pocket in and immediately below the gas dome 30. Assuming that the system is charged so that the liquid-liquid interface 54 in the separator vessel 10 is in its uppermost position so that the float 66 is in the position illustrated, the liquid interfaces in the metering vessels 130 and 150 are at the E position, and a mixture of liquid hydrocarbon and water is being supplied under pressure to the separator chamber 10 through the fluid inlet 22, the operation is as follows: Float 66 being at its uppermost position water is to be drained from the separator chamber 10 and the valve control assembly 64 closes the flow valve 60 of the light liquid exhaust line 56 and opens the heavy liquid flow line 58 by opening the flow valve 62. Because the light liquid exhaust line 56 is thus closed no liquid hydrocarbon can enter the light liquid metering apparatus 14 and as the float 66b of the light liquid metering apparatus 14 is at its highest or E position the outlet valve 160 of this light liquid metering apparatus 14 will be closed and no liquid can escape from it. Water will flow by gravity through the heavy liquid exhaust line 58 into the metering vessel 130 of the heavy liquid metering assembly 12 because the liquid interface there is in the E position actuating the valve control assembly 64a of the heavy liquid metering assembly 12 to open the inlet valve 134 and close the outlet valve 140. As the water, being the heavier liquid, rises within the metering vessel 130 it will displace the liquid hydrocarbon out the top of the metering vessel 130 through the light liquid flow line 142 back into the separator vessel 10 to replace the volume occupied by the water that has drained therefrom through the heavy liquid exhaust line 58. Upon the liquid interface in the metering vessel 130 reaching the F position the valve control assembly 64a will close the inlet valve 134 and open the outlet valve 140 so that no more water can enter the metering vessel 130. As the interior of the separator chamber 10 is under pressure from well fluids entering it this pressure will force liquid hydrocarbon through the light liquid flow line 142 into the top of the metering vessel 130 pushing downwardly on the water displacing it out the outlet line 148 until the liquid interface in the metering vessel 130 reaches the E position whereupon the cycle will be repeated. This continues with water being taken from the separator vessel 10 and its volume replaced by well fluid and metered in the metering vessel 130 until the liquid-liquid interface 54 in the separator vessel 10 falls to the lower position 54′, actuating the separator valve control assembly 64 to close the flow valve 62 in the heavy liquid exhaust line 58 and to open the flow valve 60 in the light liquid exhaust line 56. This closing of the flow valve 62 in the heavy liquid exhaust line 58 stops operation of the heavy liquid metering apparatus 12 if the float is ascending as the outlet valve 140 is closed. If the float 66a is descending the water will continue to drain out the metering vessel 130 until the float 66a reaches the E position causing the outlet valve 140 to close.

When the light liquid flow line 56 is opened the liquid hydrocarbon is free to enter the light liquid metering apparatus 14 and is forced through it by the pressure of the gas cushion within the separator vessel 10. As the light liquid metering apparatus 14 has been charged so that the liquid interface in the metering vessel 150 is at the uppermost or E position the valve control system 64b will have opened the inlet valve 154 and closed the outlet valve 160. Liquid hydrocarbon is forced into the top of the metering vessel 150 by pressure in the separator vessel 10 as the water below the liquid interface in the metering vessel 150 falls and passes through the heavy liquid flow line 162 to seek the same level as that in the separator vessel 10 and replace the volume in the separator vessel 10 formerly occupied by the liquid hydrocarbon that passed into the metering vessel 150. As the liquid interface falls in the metering vessel 150 it reaches the F position whereupon the valve actuating assembly 64b will close the inlet valve 154 and open the outlet valve 160. Pressure in the separator vessel 10 will then force water through the heavy flow line 162 into the metering vessel 150 displacing the liquid hydrocarbon out the outlet line 158 during which time this volume of water taken from the separator vessel 10 is being replaced by fluids entering the fluid inlet 22. When the liquid interface reaches the E position in the metering vessel 150 the valve control assembly 64b will again reverse the inlet and outlet valves 154 and 160 respectively closing the outlet valve 160 and opening the inlet valve 154 permitting liquid hydrocarbon to be forced into the top of the metering vessel 150 displacing water out the lower end of it repeating the cycle.

This metering of the liquid hydrocarbon continues until sufficient liquid hydrocarbon has been taken from the separator vessel 10 to lower the liquid-liquid interface in the separator vessel 10 to the position 54′ whereupon the separator valve control assembly 64 will close the flow valve 60 preventing any further liquid hydrocarbon from entering the light liquid metering apparatus 14 and will open the flow valve 62 permitting water to enter the heavy liquid metering apparatus 12. If the flow valve 60 is closed while the float 66b is descending the liquid interface in the metering vessel 150 will stop at that point as the outlet valve 160 will be closed. However, if the valve 60 is closed while the float 66b is ascending because the outlet valve 160 is opened the float 66b and the liquid interface in the metering vessel 150 will continue to rise until they reach the E position whereupon the valve control assembly 64b will close the outlet valve 160.

It is to be noted that as gas enters the separator vessel 10 in the fluid entering the fluid inlet 22 it will be separated and all but a thin layer or cushion of it will be exhausted out the gas eliminator valve 32 so that the gas-liquid interface will always be above the lower end of the nipple 55 on the light liquid exhaust line 56 and the lower end of the nipple 144 on the light liquid flow line 145 so that gas does not enter the light and heavy liquid metering apparatus 14 and 12 respectively.

Under certain flow conditions such as where there is sufficient light-liquid entering the system so that the lower end of the nipple 55 of the light liquid exhaust line 56 is never above the gas-liquid interface 33 the present separator-metering assembly may be used without the flow valve 60 in the light liquid exhaust line 56, the flow valve 62 in the heavy liquid exhaust line 58, and the separator valve control assembly 64 for these valves.

Without the flow valve 62, heavy liquid is free to flow through the heavy liquid exhaust line 58 into the metering vessel 130 at all times and there be metered in the same manner as if the flow valve 62 were held open by the separator valve control assembly 64. However, if this constant metering of the heavy liquid drains the heavy liquid level in the metering vessel 10 so that the liquid-liquid interface 54 descends to the F level in the metering vessel 130 no more heavy liquid will flow into the metering vessel 130 and the heavy liquid will remain at the same level in the separator vessel 10 and the metering vessel 130 until such time as additional heavy liquid enters the separator vessel 10 forcing the heavy liquid into the heavy liquid metering apparatus 12.

However, without the light liquid flow valve 60 and the separator valve control assembly 64 there must be sufficient light liquid entering the separator vessel 10 so that constant metering will not expose the lower end of the nipple 55 to gas; otherwise, gas will pass through the light liquid metering apparatus 14. While the present invention has been described in connection with metering of hydrocarbons and water it will be understood that any two immiscible liquids of different densities may so be metered. In addition, many rearrangements and substitutions of parts will readily suggest themselves to those skilled in the art especially in the types of valve control means and the valves. Such matters are encompassed within the spirit of the invention and the scope of the appended claims.

The present invention, therefore, is well suited to carry out the objects and attain the advantages and ends mentioned as well as others inherent therein. Accordingly, the invention is to be limited only by the spirit thereof and the scope of the appended claims.

What is claimed is:

1. A separator-meter assembly metering two immiscible liquids of different densities said assembly comprising: a separator vessel adapted to contain under pressure a layer of light liquid and a layer of heavy liquid forming a liquid-liquid interface; a fluid inlet to the separator vessel; a light liquid exhaust line connected to the separator vessel in the light liquid layer and a heavy liquid exhaust line connected to the separator vessel in the heavy liquid layer; flow valves in each such exhaust line; separator valve control means associated with the separator vessel and said flow valves responsive to movement of the liquid-liquid interface in the separator vessel adapted to alternately open and close said flow valves simultaneously so constructed and arranged that the flow valve in the light liquid exhaust line is open when the liquid-liquid interface is in a lower portion of the separator vessel and the heavy liquid exhaust line flow valve is open when the liquid-liquid interface is in an upper portion of the separator vessel; a first liquid metering apparatus including a first metering vessel having a portion thereof at a lower level than the lowest level of the liquid-liquid interface in the separator vessel, a flow line connected to an upper portion of the first metering vessel and to the separator vessel above the highest level of the liquid-liquid interface in the separator vessel, an inlet line connected to the first metering vessel and to the heavy liquid exhaust line, an outlet line connected to a lower portion of the first metering vessel, inlet and outlet valves in the inlet and outlet lines and valve control means associated with the first metering vessel and said inlet and outlet valves responsive to movement of a liquid interface in the first metering vessel adapted to alternately open and close said inlet and outlet valves simultaneously whereby said first metering vessel may be alternately filled and emptied of heavy liquid through the inlet and outlet lines; a second liquid metering apparatus including a second metering vessel having a portion thereof at a higher level than the highest liquid-liquid interface in the separator vessel, a flow line connected to a lower portion of said second metering vessel and to the separator vessel at the heavy liquid layer, an outlet line connected to an upper portion of said second metering vessel, an inlet line connected to the light liquid exhaust line and to the second metering vessel, inlet and outlet valves in the last mentioned inlet and outlet lines and valve control means associated with the second metering vessel and the last mentioned inlet and outlet valves responsive to movement of a liquid interface in the second metering vessel adapted to alternately open and close said last mentioned inlet and outlet valves simultaneously whereby said second metering vessel may be alternately filled and emptied of a light liquid through the last mentioned inlet and outlet lines.

2. The separator metering-assembly of claim 1 in which at least some of the valves are pressure responsive and the valve control means associated with such valves are so constructed and arranged to alternately direct liquid pressure to and drain it from such pressure responsive valves.

3. The separator metering assembly of claim 1 including gas eliminator means associated with the separator vessel adapted to prevent gas from entering the light liquid exhaust line.

4. A separator metering assembly for separating a gas and two immiscible liquids of different densities and alternately continuously metering said liquids, said assembly comprising, a separator vessel adapted to contain under pressure a layer of gas, a layer of light liquid and a layer of heavy liquid forming a gas liquid-interface and a liquid-liquid interface; a fluid inlet to the separator vessel; gas eliminator means in an upper portion of the separator vessel responsive to movement of the gas-liquid interface adapted to exhaust gas upon the gas-liquid interface reaching a predetermined low level in an upper portion of the separator vessel; a light liquid exhaust line connected to the separator vessel at the light liquid level and a heavy liquid exhaust line connected to the separator vessel at the heavy liquid level; a flow valve in each such exhaust line; separator valve control means associated with the separator vessel and the said flow valves responsive to movement of the liquid-liquid and to the second metering vessel, inlet and outlet valves in the last mentioned inlet and outlet lines and valve control means associated with the second metering vessel and the last mentioned inlet and outlet valves responsive to movement of a liquid interface in the second metering vessel adapted to alternately open and close said last mentioned inlet and outlet valves simultaneously whereby said second metering vessel may be alternately filled and emptied of a light liquid through the last mentioned inlet and outlet lines.

5. A separator-meter assembly metering two immiscible liquids of different densities said assembly comprising; a separator vessel adapted to contain under pressure a layer of light liquid and a layer of heavy liquid forming a liquid-liquid interface; a fluid inlet to the separator vessel; a light liquid exhaust line connected to the separator vessel in the light liquid layer and a heavy liquid exhaust line connected to the separator vessel in the heavy liquid layer; a first liquid metering apparatus including a first metering vessel having a portion thereof at a lower level than the lowest level of the liquid-liquid interface in the separator vessel, a flow line connected to an upper portion of the first metering vessel and to the separator vessel above the highest level of the liquid-liquid interface in the separator vessel, an inlet line connected to the first metering vessel and to the heavy liquid exhaust line, an outlet line connected to a lower portion of the first metering vessel, inlet and outlet valves in the inlet and outlet lines and valve control means associated with the first metering vessel and said inlet and outlet valves responsive to movement of a liquid interface in the first metering vessel adapted to alternately open and close said inlet and outlet valves simultaneously whereby said first metering vessel may be alternately filled and emptied of heavy liquid through the inlet and outlet lines; a second liquid metering apparatus including a second metering vessel having a portion thereof at a higher level than the highest liquid-liquid interface in the separator vessel, a flow line connected to a lower portion of said second metering vessel and to the separator vessel at the heavy liquid layer, an outlet line connected to an upper portion of said second metering vessel, an inlet line connected to the light liquid exhaust line and to the second metering vessel, inlet and outlet valves in the last mentioned inlet and outlet lines and valve control means associated with the second metering vessel and the last mentioned inlet and outlet valves responsive to movement of a liquid interface in the second metering vessel adapted to alternately open and close said last mentioned inlet and outlet valves simultaneously whereby said second metering vessel may be alternately filled and emptied of a light liquid through the last mentioned inlet and outlet lines.

6. A separator metering assembly for separating a gas and two immiscible liquids of different densities and alternately continuously metering said liquids, said assembly comprising, a separator vessel adapted to contain under pressure a layer of gas, a layer of light liquid and a layer of heavy liquid forming a gas liquid-interface and a liquid-liquid interface; a fluid inlet to the separator vessel; gas eliminator means in an upper portion of the separator vessel responsive to movement of the gas-liquid interface adapted to exhaust gas upon the gas-liquid interface reaching a predetermined low level in an upper portion of the separator vessel; a light liquid exhaust line connected to the separator vessel at the light liquid level and a heavy liquid exhaust line connected to the separator vessel at the heavy liquid level; a first liquid metering apparatus including a first metering vessel having a portion thereof at a lower level than the lowest level of the liquid-liquid interface in the separator vessel, a flow line connected to an upper portion of the first metering vessel and to the separator vessel above the highest level of the liquid-liquid interface in the separator vessel, an inlet line connected to the first metering vessel and to the heavy liquid exhaust line, an outlet line connected to a lower portion of the first metering vessel, inlet and outlet valves in the inlet and outlet lines and valve control means associated with the first metering vessel and said inlet and outlet valves responsive to movement of a liquid interface in the first metering vessel adapted to alternately open and close said inlet and outlet valves simultaneously whereby said first metering vessel may be alternately filled and emptied of heavy liquid through the inlet and outlet lines; a second liquid metering apparatus including a second metering vessel having a portion thereof at a higher level than the highest liquid-liquid interface in the separator vessel, a flow line connected to a lower portion of said second metering vessel and to the separator vessel at the heavy liquid layer, an outlet line connected to an upper portion of said second metering vessel, an inlet line connected to the light liquid exhaust line interface in the separator vessel adapted to alternately open and close said flow valves simultaneously whereby the flow valve in the light liquid exhaust line is open when the liquid-liquid interface is in a lower portion of the separator vessel and the heavy liquid exhaust line flow valve is open when the liquid-liquid interface is in an upper portion of the separator vessel; a first liquid metering apparatus including a first metering vessel having a portion thereof at a lower level than the lowest level of the liquid-liquid interface in the separator vessel, a flow line connected to an upper portion of the first metering vessel and to the separator vessel above the highest level of the liquid-liquid interface in the separator vessel, an inlet line connected to the first metering vessel and to the heavy liquid exhaust line, an outlet line connected to a lower portion of the first metering vessel, inlet and outlet valves in the inlet and outlet lines and valve control means associated with the first metering vessel and said inlet and outlet valves responsive to movement of a liquid interface in the first metering vessel adapted to alternately open and close said inlet and outlet valves simultaneously whereby said first metering vessel may be alternately filled and emptied of heavy liquid through the inlet and outlet lines; a second liquid metering apparatus including a second metering vessel having a portion thereof at a higher level than the highest liquid-liquid interface in the separator vessel, a flow line connected to a lower portion of said second metering vessel and to the separator vessel at the heavy liquid layer, an outlet line connected to an upper portion of said second metering vessel, an inlet line connected to the light liquid exhaust line and to the second metering vessel, inlet and outlet valves in the last mentioned inlet and outlet lines and valve control means associated with the second metering vessel and the last mentioned inlet and outlet valves responsive to movement of a liquid interface in the second metering vessel adapted to alternately open and close said last mentioned inlet and outlet valves simultaneously whereby said second metering vessel may be alternately filled and emptied of a light liquid through the last mentioned inlet and outlet lines.

References Cited in the file of this patent
UNITED STATES PATENTS 2,831,350     Banks et al.     Apr. 22, 1958